United States Patent
Lai et al.

(10) Patent No.: US 12,316,994 B2
(45) Date of Patent: May 27, 2025

(54) HIGH-RESOLUTION AND SMALL-PIXEL-SIZE OPTICAL DEVICE FOR THIRD GENERATION SEQUENCING

(71) Applicant: VisEra Technologies Company Limited, Hsin-Chu (TW)

(72) Inventors: Lai-Hung Lai, Hsin-Chu (TW); Hsin-Yi Hsieh, Hsin-Chu (TW); Chin-Chuan Hsieh, Hsin-Chu (TW)

(73) Assignee: VISERA TECHNOLOGIES COMPANY LIMITED, Hsin-Chu (TW)

( * ) Notice: Subject to any disclaimer, the term of this patent is extended or adjusted under 35 U.S.C. 154(b) by 0 days.

(21) Appl. No.: 18/453,833

(22) Filed: Aug. 22, 2023

(65) Prior Publication Data
US 2025/0071449 A1  Feb. 27, 2025

(51) Int. Cl.
*H04N 25/78* (2023.01)
*H04N 25/11* (2023.01)
*H04N 25/773* (2023.01)
*H04N 25/79* (2023.01)

(52) U.S. Cl.
CPC .............. *H04N 25/78* (2023.01); *H04N 25/11* (2023.01); *H04N 25/773* (2023.01); *H04N 25/79* (2023.01)

(58) Field of Classification Search
CPC ...... H04N 25/78; H04N 25/11; H04N 25/773; H04N 25/79
See application file for complete search history.

(56) References Cited

U.S. PATENT DOCUMENTS

| | | | |
|---|---|---|---|
| 8,399,855 B2 | 3/2013 | Van Der Zaag et al. | |
| 8,865,077 B2 * | 10/2014 | Chiou | G01N 21/6454 422/82.11 |
| 8,865,078 B2 * | 10/2014 | Chiou | G01N 21/6486 435/6.12 |
| 2012/0156100 A1 * | 6/2012 | Tsai | G01N 21/6454 977/840 |
| 2015/0311376 A1 | 10/2015 | Yu | |
| 2016/0334334 A1 | 11/2016 | Saxena et al. | |
| 2017/0030834 A1 | 2/2017 | Fehr et al. | |
| 2021/0174052 A1 | 6/2021 | Tan et al. | |

FOREIGN PATENT DOCUMENTS

TW   201621301 A   6/2016

* cited by examiner

*Primary Examiner* — Seung C Sohn
(74) *Attorney, Agent, or Firm* — MUNCY, GEISSLER, OLDS & LOWE, P.C.

(57) ABSTRACT

An optical device is provided. The optical device includes a substrate, a first photodetector, a waveguide and a nanowell array. The first photodetector is disposed on the substrate. The waveguide is disposed on the first photodetector. The waveguide is in contact with the first photodetector or apart from the first photodetector by a color filter array which is in contact with the waveguide and the first photodetector. The nanowell array is disposed on the waveguide. There is no multi-film filter in the optical device.

20 Claims, 11 Drawing Sheets

28'

| 28a | 28b | 28a | 28b |
|---|---|---|---|
| 28c | 28d | 28c | 28d |
| 28a | 28b | 28a | 28b |
| 28c | 28d | 28c | 28d |

FIG. 4

HIGH-RESOLUTION AND SMALL-PIXEL-SIZE OPTICAL DEVICE FOR THIRD GENERATION SEQUENCING

BACKGROUND OF THE INVENTION

Field of the Invention

The present invention relates to an optical device, and more particularly to an optical device for third generation sequencing (TGS).

Description of the Related Art

TGS, also referred to as long-read sequencing, offers a precision rate of 99.9% and faster processing speeds than NGS, which relies on short-read methods. The technology behind TGS involves using SMRT sequencing, which utilizes single molecules to emit photoluminescence through fluorescently-labeled nucleotides incorporated into anchored polymerases. Due to the weak emission of single molecules, an optical-density filter with an OD greater than 6 is necessary to eliminate interference from excitation light. This filter is often an interference type multifilm filter with a thickness greater than 10 μm on CMOS-based DNA sequencing chips. To make whole-genome sequencing cost-effective and faster, a small-pixel-size imaging system with high resolution is required. However, the current technology relies on an ultra-thick multi-film filter to achieve a high signal-to-noise ratio, which restricts the imaging system's size reduction and, therefore, the sequencing cost.

BRIEF SUMMARY OF THE INVENTION

The invention showcases a method for creating miniaturized TGS (Third-generation sequencing) CMOS chips without relying on optical-density (OD) filters. This eliminates the need for expensive fabrication costs and enables a reduction in pixel size.

In accordance with one embodiment of the present invention, an optical device is provided. The optical device includes a substrate, a first photodetector, a waveguide and a nanowell array. The first photodetector is disposed on the substrate. The waveguide is disposed on the first photodetector. The waveguide is in contact with the first photodetector or apart from the first photodetector by a color filter array which is in contact with the waveguide and the first photodetector. The nanowell array is disposed on the waveguide.

In some embodiments, the substrate includes a CMOS read circuit array.

In some embodiments, the waveguide transmits long-wavelength light with a wavelength of 800 nm to 1,600 nm. In some embodiments, the nanowell array is loaded with fluorescently-labeled nucleotides that convert the long-wavelength light to short-wavelength light with a wavelength of 400 nm to 800 nm. In some embodiments, the first photodetector includes a first photoactive layer with a first bandgap smaller than photon energy of the short-wavelength light and larger than the photon energy of the long-wavelength light. In some embodiments, the first bandgap of the first photoactive layer is in a range from 1.5 eV to 2.5 eV. In some embodiments, the first photoactive layer includes organic semiconductors, inorganic semiconductors or perovskite. In some embodiments, the first photoactive layer absorbs the short-wavelength light. In some embodiments, the optical device has a pixel size less than 10 μm.

In some embodiments, the optical device further includes a second photodetector including a second photoactive layer with a second bandgap disposed between the substrate and the first photodetector. In some embodiments, the first bandgap of the first photoactive layer is larger than the second bandgap of the second photoactive layer. In some embodiments, the optical device further includes a third photodetector including a third photoactive layer with a third bandgap disposed between the substrate and the second photodetector. In some embodiments, the second bandgap of the second photoactive layer is larger than the third bandgap of the third photoactive layer. In some embodiments, the optical device further includes a fourth photodetector including a fourth photoactive layer with a fourth bandgap disposed between the substrate and the third photodetector. In some embodiments, the third bandgap of the third photoactive layer is larger than the fourth bandgap of the fourth photoactive layer. In some embodiments, the first photoactive layer absorbs light with a wavelength of 400 nm to 550 nm, the second photoactive layer absorbs short-wavelength light with a wavelength of 530 nm to 650 nm, the third photoactive layer absorbs short-wavelength light with a wavelength of 580 nm to 700 nm, and the fourth photoactive layer absorbs short-wavelength light with a wavelength of 620 nm to 750 nm. In some embodiments, the optical device has a pixel size less than 20 μm.

In some embodiments, the waveguide transmits short-wavelength light with a wavelength of 300 nm to 500 nm. In some embodiments, the nanowell array is loaded with polymerase that converts the short-wavelength light to long-wavelength light with a wavelength of 500 nm to 800 nm. In some embodiments, the first photodetector includes a first photoactive layer with a first bandgap, a second photoactive layer with a second bandgap, a third photoactive layer with a third bandgap, and a fourth photoactive layer with a fourth bandgap configured in a mosaic on a level. In some embodiments, the first bandgap, the second bandgap, the third bandgap, and the fourth bandgap are different. In some embodiments, the first photoactive layer, the second photoactive layer, the third photoactive layer, and the fourth photoactive layer have a thickness larger than 2 μm. In some embodiments, the first photoactive layer absorbs light with a wavelength of 550 nm, the second photoactive layer absorbs long-wavelength light with a wavelength of 650 nm, the third photoactive layer absorbs long-wavelength light with a wavelength of 700 nm, and the fourth photoactive layer absorbs long-wavelength light with a wavelength of 750 nm.

In some embodiments, the first photodetector includes a first photoactive layer with a first bandgap and has a thickness larger than 2 μm. In some embodiments, the optical device further includes a second photodetector including a second photoactive layer with a second bandgap disposed between the substrate and the first photodetector. In some embodiments, the first bandgap of the first photoactive layer is larger than the second bandgap of the second photoactive layer. In some embodiments, the optical device further includes a third photodetector including a third photoactive layer with a third bandgap disposed between the substrate and the second photodetector. In some embodiments, the second bandgap of the second photoactive layer is larger than the third bandgap of the third photoactive layer. In some embodiments, the optical device further includes a fourth photodetector including a fourth photoactive layer with a fourth bandgap disposed between the substrate and the third photodetector. In some embodiments, the third bandgap of the third photoactive layer is larger than the fourth bandgap of the fourth photoactive layer. In some embodiments, the first photoactive layer absorbs light with a wavelength of 550 nm, the second photoactive layer absorbs long-wavelength light with a wavelength of 530-650 nm, the third photoactive layer absorbs long-wavelength light with a wavelength of 580-700 nm, and the fourth photoactive layer absorbs long-wavelength light with a wavelength of 620-750 nm.

In the present invention, when the long-wavelength light is used as a light source, in combination with the fluorescently-labeled nucleotides that can convert the long-wavelength light to the short-wavelength light located in the sample wells, and the wide bandgap semiconductors that has sensitivity in the short-wavelength light used in the photoactive layer, there is no need to add a long-pass or short-pass filter, which significantly reduces the module thickness, allowing for smaller pixel size, without the problem of optical crosstalk. In addition, when the short-wavelength light is used as a light source, in combination with the thick photoactive layer, the short-wavelength light (i.e. noise) can be filtered out by the thick photoactive layer, at the same time, the photoactive layer improves the sensitivity in narrow-band light (i.e. signal), achieving high S/N ratio. The present invention provides a high-resolution and small-pixel-size optical device for third generation sequencing (TGS).

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein:

FIG. 4 shows a top view of some components in an optical device in accordance with one embodiment of the present invention;

DETAILED DESCRIPTION OF THE INVENTION

Figure 1A:
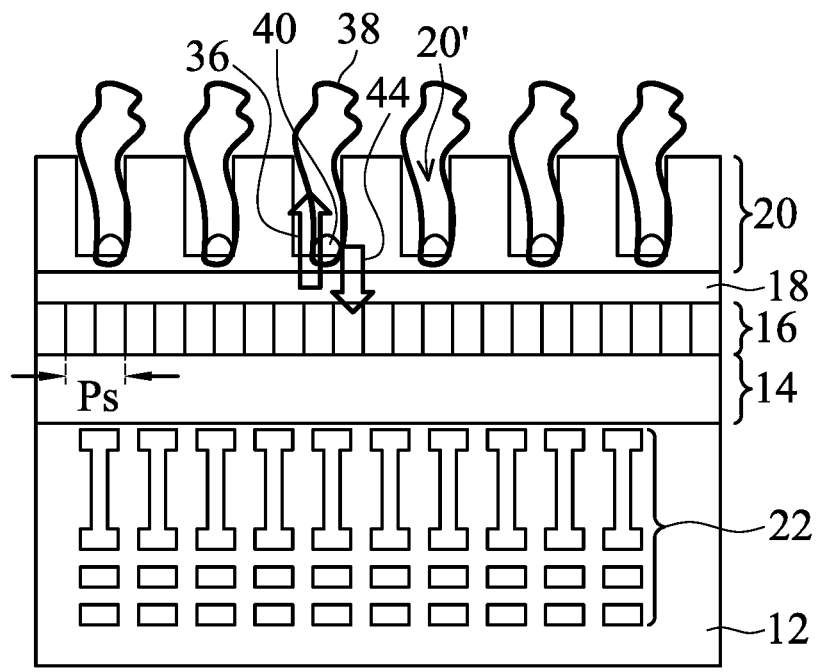
FIG. 1A shows a cross-sectional view of an optical device in accordance with one embodiment of the present invention.

The optical device of the present invention is described in detail in the following description. In the following detailed description, for purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept may be embodied in various forms without being limited to those exemplary embodiments. In addition, the drawings of different embodiments may use like and/or corresponding numerals to denote like and/or corresponding elements in order to clearly describe the present disclosure. However, the use of like and/or corresponding numerals in the drawings of different embodiments does not suggest any correlation between different embodiments. In addition, in this specification, expressions such as "first material layer disposed on/over a second material layer", may indicate the direct contact of the first material layer and the second material layer, or it may indicate a non-contact state with one or more intermediate layers between the first material layer and the second material layer. In the above situation, the first material layer may not be in direct contact with the second material layer.

In addition, in this specification, relative expressions are used. For example, "lower", "bottom", "higher" or "top" are used to describe the position of one element relative to another. It should be appreciated that if a device is flipped upside down, an element that is "lower" will become an element that is "higher".

Unless defined otherwise, all technical and scientific terms used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined.

In the description, relative terms such as "lower", "upper", "horizontal", "vertical", "above", "below", "up", "down", "top" and "bottom" as well as derivative thereof (e.g., "horizontally", "downwardly", "upwardly", etc.) should be construed as referring to the orientation as described or as shown in the drawing under discussion. These relative terms are for convenience of description and do not require that the apparatus be constructed or operated in a particular orientation. Terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise.

It should be understood that, although the terms first, second, third etc. may be used herein to describe various elements, components, regions, layers, portions and/or sections, these elements, components, regions, layers, portions and/or sections should not be limited by these terms. These terms are only used to distinguish one element, component, region, layer, portion or section from another element, component, region, layer or section. Thus, a first element, component, region, layer, portion or section discussed below could be termed a second element, component, region, layer, portion or section without departing from the teachings of the present disclosure.

Herein, the terms "about", "around" and "substantially" typically mean+/−20% of the stated value or range, typically +/−10% of the stated value or range, typically +/−5% of the stated value or range, typically +/−3% of the stated value or range, typically +/−2% of the stated value or range, typically +/−1% of the stated value or range, and typically +/−0.5% of the stated value or range. The stated value of the present disclosure is an approximate value. Namely, the meaning of "about", "around" and "substantially" may be implied if there is no specific description of "about", "around" and "substantially".

The following description is of the best-contemplated mode of carrying out the invention. This description is made for the purpose of illustrating the general principles of the invention and should not be taken in a limiting sense. The scope of the invention is best determined by reference to the appended claims.

Figure 1B:
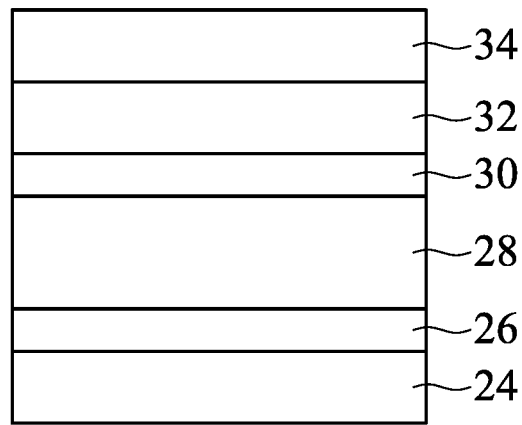
FIG. 1B shows an enlarged cross-sectional view of some components in an optical device in accordance with one embodiment of the present invention.
Figure 1C:
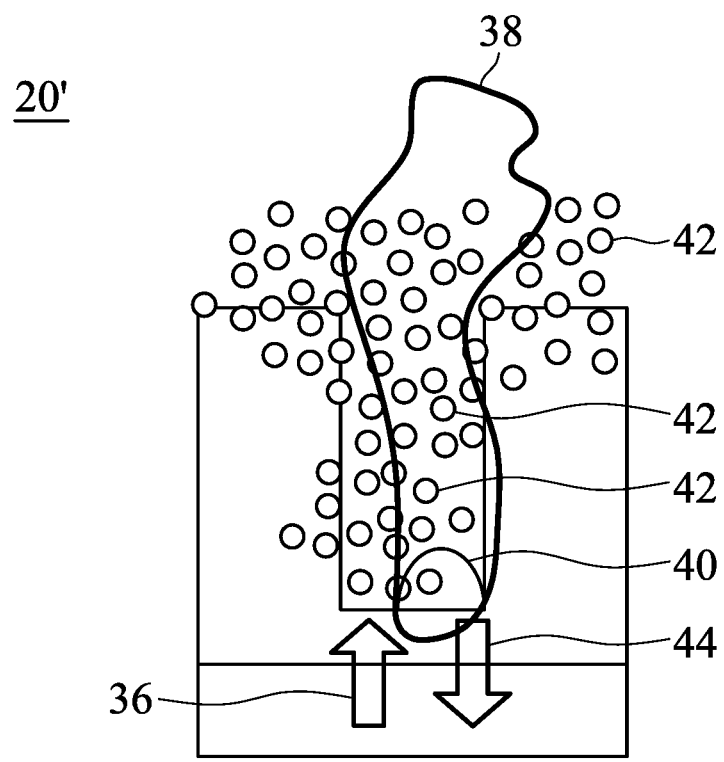
FIG. 1C shows an enlarged cross-sectional view of some components in an optical device in accordance with one embodiment of the present invention.

Referring to FIGS. 1A to 1C, in accordance with one embodiment of the present invention, an optical device 10 is provided. FIG. 1A shows a cross-sectional view of the optical device 10. FIG. 1B shows an enlarged cross-sectional view of some components (i.e. a photodetector) in the optical device 10. FIG. 1C shows an enlarged cross-sectional views of some components (i.e. a well in a well array) in the optical device 10.

As shown in FIG. 1A, the optical device 10 includes a substrate 12, a photodetector 14, a color filter array 16, a waveguide 18 and a nanowell array 20. The photodetector 14 is disposed on the substrate 12. The color filter array 16 is disposed on the photodetector 14. The waveguide 18 is disposed on the color filter array 16. The nanowell array 20 is disposed on the waveguide 18.

In some embodiments, the substrate 12 includes a silicon substrate, but the present invention is not limited thereto. In some embodiments, the substrate 12 includes a CMOS read circuit array 22.

Referring to FIG. 1B, the detailed structure of the photodetector 14 is further provided. In some embodiments, the photodetector 14 includes a bottom electrode 24, an electron transport layer (ETL) 26, a photoactive layer 28, a hole transport layer (HTL) 30, a top electrode 32 and an encapsulation layer 34. The electron transport layer (ETL) 26 is disposed on the bottom electrode 24. The photoactive layer 28 is disposed on the electron transport layer (ETL) 26. The hole transport layer (HTL) 30 is disposed on the photoactive layer 28. The top electrode 32 is disposed on the hole transport layer (HTL) 30. The encapsulation layer 34 is disposed on the top electrode 32. In some embodiments, the bandgap of the photoactive layer 28 is in a range from about 1.5 eV to about 2.5 eV. In some embodiments, the material of the photoactive layer 28 includes organic semiconductors, inorganic semiconductors or perovskite, for example, amorphous silicon (a-Si), $Zu_2ZnSnS_4$, $CH_3NH_3PbCl_3$, $CH_3NH_3PbBr_3$, $CH_3NH_3PbI_3$ or the blends of Rubrene, UPSQ, P3HT, PBT-OTT, OC1C10-PPV, PCDTBT, PDPPST, PDPP3T, PDPPSDTPS, PCBM, P70BM, C60, C70, ICBA, bis-PCBM, [60]IPB, N2200, Y6, Y7, COTIC-4Cl, 6TIC, ZY-4Cl, IEICO-4Cl, ITIC, ITIC-4F, ITIC-M, DTY6, BTP-eC9, ITIC-Th, o-IDTBR, ITIC-4Cl, COTIC-4Cl, 6TIC, IDT-2Br, COTIC-4F, ITIC-DM, ZY-4Cl, IEICO-4Cl, BTP-4Cl-12, N3, L8-BO-F, or L8-BO, but the present invention is not limited thereto.

In some embodiments, the waveguide 18 transmits long-wavelength light 36. In some embodiments, the wavelength of the long-wavelength light 36 is in a range from about 800 nm to about 1,600 nm. In some embodiments, the long-wavelength light 36 includes near-infrared (NIR) light and short-wave infrared (SWIR) light.

Referring to FIG. 1C, in some embodiments, a nanowell 20' in the nanowell array 20 is loaded with, for example, DNA 38, polymerase 40 and fluorescently-labeled nucleotides 42. In some embodiments, the fluorescently-labeled nucleotides 42 include four different fluorescently-labeled nucleotides used for identifying A, T, G and C bases on DNA 38, respectively. In some embodiments, the fluorescently-labeled nucleotides 42 includes, for example, a compound of $(ErL)_2F$ (Er: erbium (rare-earth element), L:

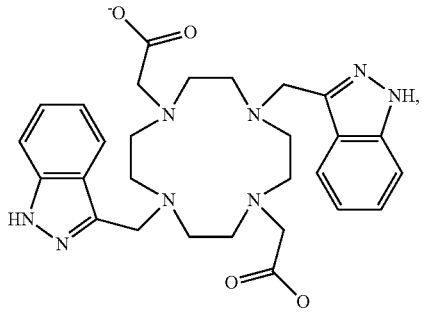

F: fluorine), but the present invention is not limited thereto. In some embodiments, the fluorescently-labeled nucleotides 42 convert the long-wavelength light 36 to short-wavelength light 44. In some embodiments, the wavelength of the short-wavelength light 44 is in a range from about 400 nm to about 800 nm. In some embodiments, the short-wavelength light 44 includes visible light.

In some embodiments, in the optical device 10, the pixel size Ps is less than or equal to about 10 μm.

Referring to FIGS. 1A to 1C, the sensing mechanism of the optical device 10 is further illustrated as follows. The waveguide 18 transmits the long-wavelength light 36 (i.e. excitation light) towards the nanowell 20' in the nanowell array 20. In the nanowell 20', polymerase 40 binds to a specific base (i.e. A, T, G or C) on single-stranded DNA 38 with the corresponding fluorescently-labeled nucleotides 42. As anchored polymerases incorporate the fluorescently-labeled nucleotides 42, it absorbs the long-wavelength light 36 and emit the specific short-wavelength light 44 (i.e. emission light) by up conversion molecular. The wavelength of the emission light depends on the species of the anchored base. For example, the base A anchored polymerases-fluorescently-labeled nucleotides emits the photons in the wavelength between 400-550 nm; the base T anchored polymerases-fluorescently-labeled nucleotides emits the photons in the wavelength between 530-650 nm; the base G anchored polymerases-fluorescently-labeled nucleotides emits the photons in the wavelength between 580-700 nm; the base C anchored polymerases-fluorescently-labeled nucleotides emits the photons in the wavelength between 620-750 nm. The process of up conversion involves the generation of light at a higher energy level by combining photons of low energy, known as an anti-Stokes luminescent process. This phenomenon is often observed in lanthanide-doped phosphors and lanthanide-based nanoparticles. Lanthanide ions, such as Er, Tm, and Ho, have energy levels that span from the Near-infrared (NIR) to the visible region, and they exhibit long-lived excited states due to Laporte forbidden electric dipole transitions. These factors make multiple first-order absorption phenomena possible, resulting in the cumulative effect of up conversion (UC). The specific short-wavelength light 44 passes through the specific color filter in the color filter array 16. The photodetector 14 absorbs the specific short-wavelength light 44, converts the optical signal of the specific short-wavelength light 44 into an electrical signal, and transmits the electrical signal to the readout circuit (not shown) in the substrate 12 to identify the specific base on DNA 38.

Figure 1D:
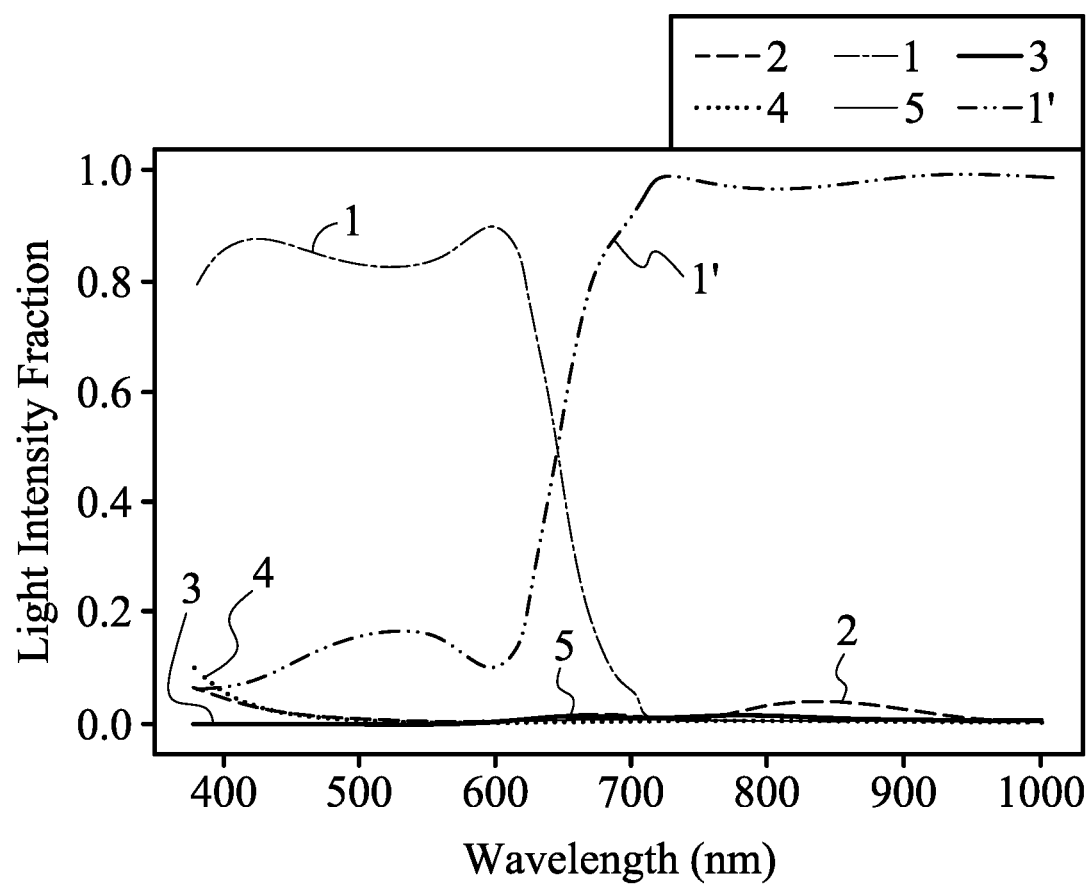
FIG. 1D shows absorption and reflection spectrum of photodetectors in accordance with one embodiment of the present invention.

Next, according to the absorption (curve 1) and reflection spectrum (curve 1') of the photodetector 14 shown in FIG. 1D, it is further illustrated that the photodetector 14 can absorb short-wavelength light below 800 nm and has no sensitivity above 800 nm to achieve the purpose of eliminating noise. In some embodiments, the wavelength of the excitation light transmitted by the waveguide 18 is in a range from about 800 nm to about 1,600 nm, for example, 840 nm. In FIG. 1D, the absorption intensity of the photoactive layer 28 (i.e. P3HT: PCBM) for different wavebands is represented by curve 1. From curve 1, the photoactive layer 28 has strong absorption for the short-wavelength emission light with the wavelength of about 400-800 nm, for example, the absorption intensity of about 0.8 or more. However, the photoactive layer 28 hardly absorbs the long-wavelength emission light with the wavelength of more than 800 nm. The absorption spectrum of other material layers in the photodetector 14 is also illustrated, for example, the material layer of indium tin oxide (ITO) (represented by curve 2), silver (Ag) (represented by curve 3), aluminum-doped zinc oxide (AZO) (represented by curve 4) and molybdenum oxide ($MoO_3$) (represented by curve 5). There is a great difference in the absorption intensity for different wavebands from the photoactive layer 28. For example, from curves 2 to 5, it can be seen that such material layers (such as ITO, Ag, AZO and $MoO_3$) hardly absorb the short-wavelength emission light with the wavelength of about 400-800 nm. In addition, the reflection intensity of the photodetector 14 for different wavebands is represented by curve 1'. From curve 1', the photodetector 14 has strong reflection for the long-wavelength emission light with the wavelength of more than 800 nm, for example, the reflection intensity of about 0.9 or more. Therefore, the photodetector 14 with the photoactive layer 28 having the specific wide-bandgap material can absorb short-wavelength light and has no sensitivity for long-wavelength light above 800 nm. In other words, since the bandgap of the photoactive layer 28 of the photodetector 14 is smaller than the photon energy of the short-wavelength light 44 but larger than the photon energy of the long-wavelength light 36, the photoactive layer 28 has sensitivity in the short-wavelength light 44 but no sensitivity in the long-wavelength light 36. That is, the photoactive layer 28 does not absorb the long-wavelength light 36 (as noise in this case), achieving high S/N ratio.

Figure 2A:
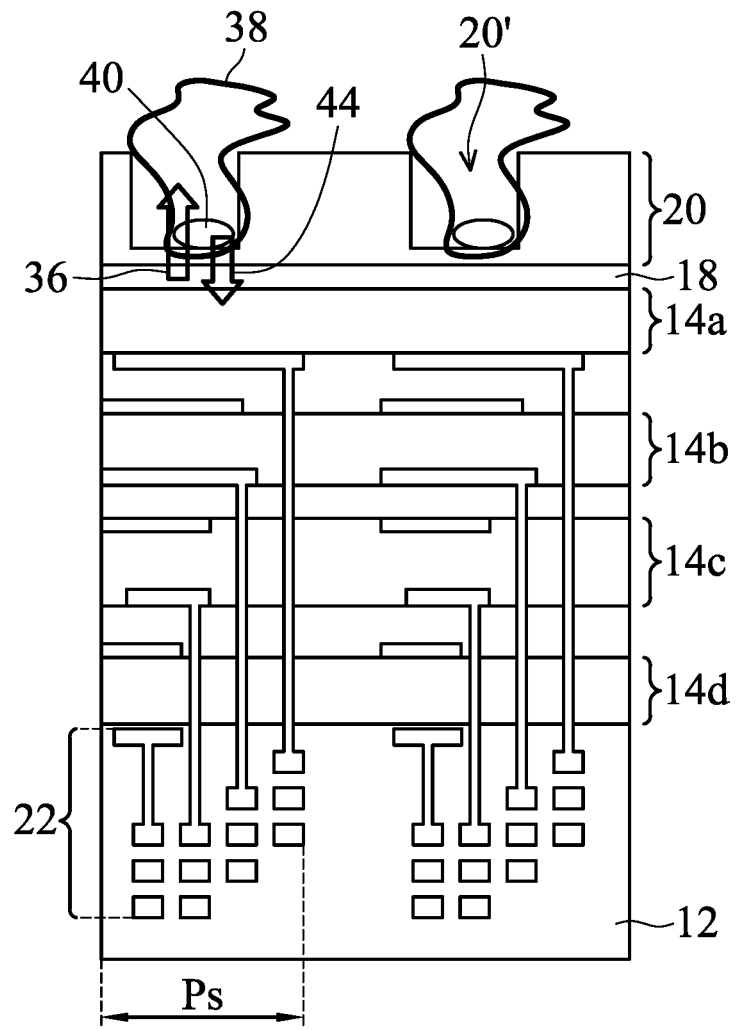
FIG. 2A shows a cross-sectional view of an optical device in accordance with one embodiment of the present invention.

Referring to FIG. 2A, in accordance with one embodiment of the present invention, an optical device 10 is provided. FIG. 2A shows a cross-sectional view of the optical device 10.

As shown in FIG. 2A, the optical device 10 includes a substrate 12, a first photodetector 14a, a second photodetector 14b, a third photodetector 14c, a fourth photodetector 14d, a waveguide 18 and a nanowell array 20. The fourth photodetector 14d is disposed on the substrate 12. The third photodetector 14c is disposed on the fourth photodetector 14d. The second photodetector 14b is disposed on the third photodetector 14c. The first photodetector 14a is disposed on the second photodetector 14b. The waveguide 18 is disposed on the first photodetector 14a. The nanowell array 20 is disposed on the waveguide 18.

In some embodiments, the substrate 12 includes a silicon substrate, but the present invention is not limited thereto. In some embodiments, the substrate 12 includes a CMOS read circuit array 22.

The detailed structure of each the first photodetector 14a, the second photodetector 14b, the third photodetector 14c and the fourth photodetector 14d includes a bottom electrode, an electron transport layer (ETL), a photoactive layer, a hole transport layer (HTL), a top electrode and an encapsulation layer, which is similar to the structure of the photodetector 14 shown in FIG. 1B, and will not be repeated here. In some embodiments, the bandgap of the photoactive layer in each the first photodetector 14a, the second photodetector 14b, the third photodetector 14c and the fourth photodetector 14d is in a range from about 1.5 eV to about 2.5 eV. In some embodiments, the bandgap of the photoactive layer in the first photodetector 14a is larger than the bandgap of the photoactive layer in the second photodetector 14b. The bandgap of the photoactive layer in the second photodetector 14b is larger than the bandgap of the photoactive layer in the third photodetector 14c. The bandgap of the photoactive layer in the third photodetector 14c is larger than the bandgap of the photoactive layer in the fourth photodetector 14d.

In some embodiments, the materials of the photoactive layers in the first photodetector 14a, the second photodetector 14b, the third photodetector 14c and the fourth photodetector 14d include organic semiconductors, inorganic semiconductors or perovskite, for example, amorphous silicon (a-Si), $Zu_2ZnSnS_4$, $CH_3NH_3PbCl_3$, $CH_3NH_3PbBr_3$, $CH_3NH_3PbI_3$ or blends of Rubrene, UPSQ, P3HT, PBT-OTT, OC1C10-PPV, PCDTBT, PDPPST, PDPP3T, PDPPSDTPS, PCBM, P70BM, C60, C70, ICBA, bis-PCBM, [60]IPB, N2200, Y6, Y7, COTIC-4Cl, 6TIC, ZY-4Cl, IEICO-4Cl, ITIC, ITIC-4F, ITIC-M, DTY6, BTP-eC9, ITIC-Th, o-IDTBR, ITIC-4Cl, COTIC-4Cl, 6TIC, IDT-2Br, COTIC-4F, ITIC-DM, ZY-4Cl, IEICO-4Cl, BTP-4Cl-12, N3, L8-BO-F, or L8-BO, but the present invention is not limited thereto. In some embodiments, the materials of the photoactive layers in the first photodetector 14a, the second photodetector 14b, the third photodetector 14c and the fourth photodetector 14d are different. For example, the material of the photoactive layer in the first photodetector 14a absorbs light with a wavelength of between 400-550 nm. The material of the photoactive layer in the second photodetector 14b absorbs light with a wavelength of between 530-650 nm. The material of the photoactive layer in the third photodetector 14c absorbs orange light with a wavelength of between 580-700 nm. The material of the photoactive layer in the fourth photodetector 14d absorbs red light with a wavelength of about 620-750 nm.

In some embodiments, the waveguide 18 transmits long-wavelength light 36. In some embodiments, the wavelength of the long-wavelength light 36 is in a range from about 800 nm to about 1,600 nm. In some embodiments, the long-wavelength light 36 includes near-infrared (NIR) light and short-wave infrared (SWIR) light.

DNA 38, polymerase 40 and fluorescently-labeled nucleotides 42 are loaded in a nanowell 20' in the nanowell array 20, similar to the loading state shown in FIG. 1C, and will not be repeated here.

In some embodiments, in the optical device 10, the pixel size Ps is less than or equal to about 20 μm.

Referring to FIGS. 2A and 1C, the sensing mechanism of the optical device 10 is further illustrated as follows. The waveguide 18 transmits the long-wavelength light 36 (i.e. excitation light) towards the nanowell 20' in the nanowell array 20. In the nanowell 20', polymerase 40 binds to a specific base (i.e. A, T, G or C) on DNA 38 with the corresponding fluorescently-labeled nucleotides 42. The fluorescently-labeled nucleotides 42 absorb the long-wavelength light 36 and emit the specific short-wavelength light 44 (i.e. emission light). For example, when the fluorescently-labeled nucleotides 42 emit light with a wavelength of about 500 nm, since the photon energy of the light source is smaller than the bandgap of the photoactive layer in the first photodetector 14a, the first photodetector 14a only absorbs the 500 nm light, converts the optical signal into an electrical signal, and transmits the electrical signal to the readout circuit (not shown) in the substrate 12 to identify the specific base on DNA 38 which corresponds to the light with wavelength of 500 nm. When the fluorescently-labeled nucleotides 42 emit light with a wavelength of about 600 nm, since the photon energy of the light is smaller than the bandgap of the photoactive layer in the first photodetector 14a but larger than the bandgap of the photoactive layer in the second photodetector 14b, light with a wavelength of about 600 nm passes through the first photodetector 14a, but the second photodetector 14b absorbs the light with a wavelength of about 600 nm, converts the optical signal of the green light into an electrical signal, and transmits the electrical signal to the readout circuit (not shown) in the substrate 12 to identify the specific base on DNA 38 which corresponds to the green light. When the fluorescently-labeled nucleotides 42 emit light with a wavelength of about 650 nm, since the photon energy of the light with a wavelength of about 650 nm is smaller than the bandgaps of the photoactive layers in the first and second photodetector 14a and the second photodetector 14b but larger than the bandgap of the photoactive layer in the third photodetector 14c, the light with a wavelength of about 650 nm passes through the first photodetector 14a and the second photodetector 14b, but the third photodetector 14c absorbs the orange light, converts the optical signal of the light with a wavelength of about 650 nm into an electrical signal, and transmits the electrical signal to the readout circuit (not shown) in the substrate 12 to identify the specific base on DNA 38 which corresponds to the light with a wavelength of about 650 nm. When the fluorescently-labeled nucleotides 42 emit light with a wavelength of about 700 nm, since the photon energy of the light with a wavelength of about 700 nm is smaller than the bandgaps of the photoactive layers in the first photodetector 14a, the second photodetector 14b and the third photodetector 14c but larger than the bandgap of the photoactive layer in the fourth photodetector 14d, the light with a wavelength of about 700 nm passes through the first photodetector 14a, the second photodetector 14b and the third photodetector 14c, but the fourth photodetector 14d absorbs the light with a wavelength of about 700 nm, converts the optical signal of the red light into an electrical signal, and transmits the electrical signal to the readout circuit (not shown) in the substrate 12 to identify the specific base on DNA 38 which corresponds to the light with a wavelength of about 700 nm.

Figure 2B:
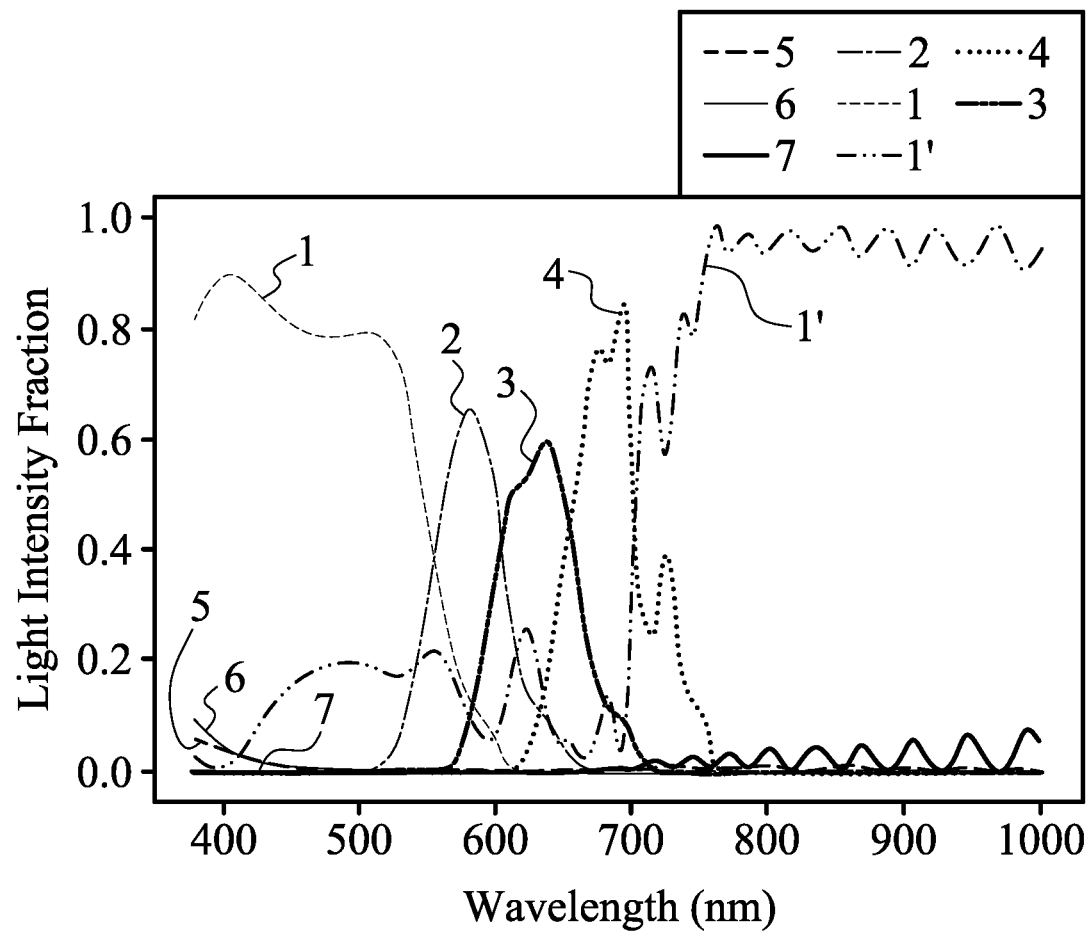
FIG. 2B shows absorption and reflection spectrum of photodetectors in accordance with one embodiment of the present invention.

Next, according to the absorption and reflection spectrum of the photodetectors shown in FIG. 2B, it is further illustrated that the first photodetector 14a, the second photodetector 14b, the third photodetector 14c and the fourth photodetector 14d can respectively absorb short-wavelength light with different wavebands and filter out long-wavelength light (i.e. with narrowband characteristics) to achieve the purpose of eliminating noise. In some embodiments, the wavelength of the excitation light transmitted by the waveguide 18 is in a range from about 800 nm to about 1,600 nm, for example, 980 nm. The photoactive layer can be composed by the blend of Rubrene, UPSQ, P3HT, PBT-OTT, OC1C10-PPV, PCDTBT, PDPPST, PDPP3T, PDPPSDTPS, PCBM, P70BM, C60, C70, ICBA, bis-PCBM, [60]IPB, N2200, Y6, Y7, COTIC-4Cl, 6TIC, ZY-4Cl, COTIC-4Cl, 6TIC, IDT-2Br, COTIC-4F, ITIC-DM, ZY-4Cl, IEICO-4Cl, BTP-4Cl-12, N3, L8-BO-F, or L8-BO. In FIG. 2B, the absorption intensity of the photoactive layer (i.e. UPSQ) of the first photodetector 14a for different wavebands is represented by curve 1. The absorption intensity of the photoactive layer (i.e. PBT-OTT: PCBM) of the second photodetector 14b for different wavebands is represented by curve 2. The absorption intensity of the photoactive layer (i.e. OC1C10-PPV: PCBM) of the third photodetector 14c for different wavebands is represented by curve 3. The absorption intensity of the photoactive layer (i.e. PTB7-Th: PCBM) of the fourth photodetector 14d for different wavebands is represented by curve 4.

The photoactive layer can be composed by the blend of Rubrene, UPSQ, P3HT, PBT-OTT, OC1C10-PPV, PCDTBT, PDPPST, PDPP3T, PDPPSDTPS, PCBM, P70BM, C60, C70, ICBA, bis-PCBM, [60]IPB, N2200, Y6, Y7, COTIC-4Cl, 6TIC, ZY-4Cl, IEICO-4Cl, ITIC, ITIC-4F, ITIC-M, DTY6, BTP-eC9, ITIC-Th, o-IDTBR, ITIC-4Cl, COTIC-4Cl, 6TIC, IDT-2Br, COTIC-4F, ITIC-DM, ZY-4Cl, IEICO-4Cl, BTP-4Cl-12, N3, L8-BO-F, or L8-BO. From curve 1, the photoactive layer (i.e. UPSQ) of the first photodetector 14a has strong absorption for the specific short-wavelength emission light with the wavelength of about 400-550 nm, for example, the absorption intensity of about 0.8 or more. However, the photoactive layer of the first photodetector 14a hardly absorbs the emission light with the wavelength of more than 550 nm. From curve 2, the photoactive layer (i.e. PBT-OTT: PCBM) of the second photodetector 14b has strong absorption for the specific short-wavelength emission light with the wavelength of about 530-650 nm, for example, the absorption intensity of about 0.65 or more. However, the photoactive layer of the second photodetector 14b hardly absorbs the emission light with the wavelength of more than 650 nm. From curve 3, the photoactive layer (i.e. OC1C10-PPV: PCBM) of the third photodetector 14c has strong absorption for the specific short-wavelength emission light with the wavelength of about 580-700 nm, for example, the absorption intensity of about 0.6 or more. However, the photoactive layer of the third photodetector 14c hardly absorbs the emission light with the wavelength of more than 700 nm. From curve 4, the photoactive layer (i.e. PTB7-Th: PCBM) of the fourth photodetector 14d has strong absorption for the specific short-wavelength emission light with the wavelength of about 620-750 nm, for example, the absorption intensity of about 0.8 or more. However, the photoactive layer of the fourth photodetector 14d hardly absorbs the emission light with the wavelength of more than 750 nm."

The absorption spectrum of other material layers in the photodetectors is also illustrated, for example, the material layer of indium tin oxide (ITO) (represented by curve 5), the interlayer (represented by curve 6) and the material layer of silver (Ag) (represented by curve 7). There is a great difference in the absorption intensity for different wavebands from the photoactive layers. For example, from curves 5 to 7, it can be seen that such material layers (such as ITO, the interlayer and Ag) hardly absorb the short-wavelength emission light with the wavelength of about 400-800 nm. In addition, the reflection intensity of the photodetectors for different wavebands is represented by curve 1'. From curve 1', the photodetectors have strong reflection for the long-wavelength emission light with the wavelength of more than 800 nm, for example, the reflection intensity of about 0.9 or more. Therefore, the first photodetector 14a, the second photodetector 14b, the third photodetector 14c and the fourth photodetector 14d, each having the photoactive layer with the specific wide-bandgap material, can respectively absorb short-wavelength light with different wavebands and has no sensitivity above 800 nm wavelength. In other words, since the bandgaps of the photoactive layers in the first photodetector 14a, the second photodetector 14b, the third photodetector 14c and the fourth photodetector 14d are different (decreasing from top to bottom) and larger than the photon energy of the long-wavelength light 36, the photoactive layers in the first photodetector 14a, the second photodetector 14b, the third photodetector 14c and the fourth photodetector 14d respectively has sensitivity in the short-wavelength light 44 with different wavebands but no sensitivity in the long-wavelength light 36. That is, the photoactive layers in the first photodetector 14a, the second photodetector 14b, the third photodetector 14c and the fourth photodetector 14d do not absorb the long-wavelength light 36 (as noise in this case), achieving high S/N ratio.

Figure 3:
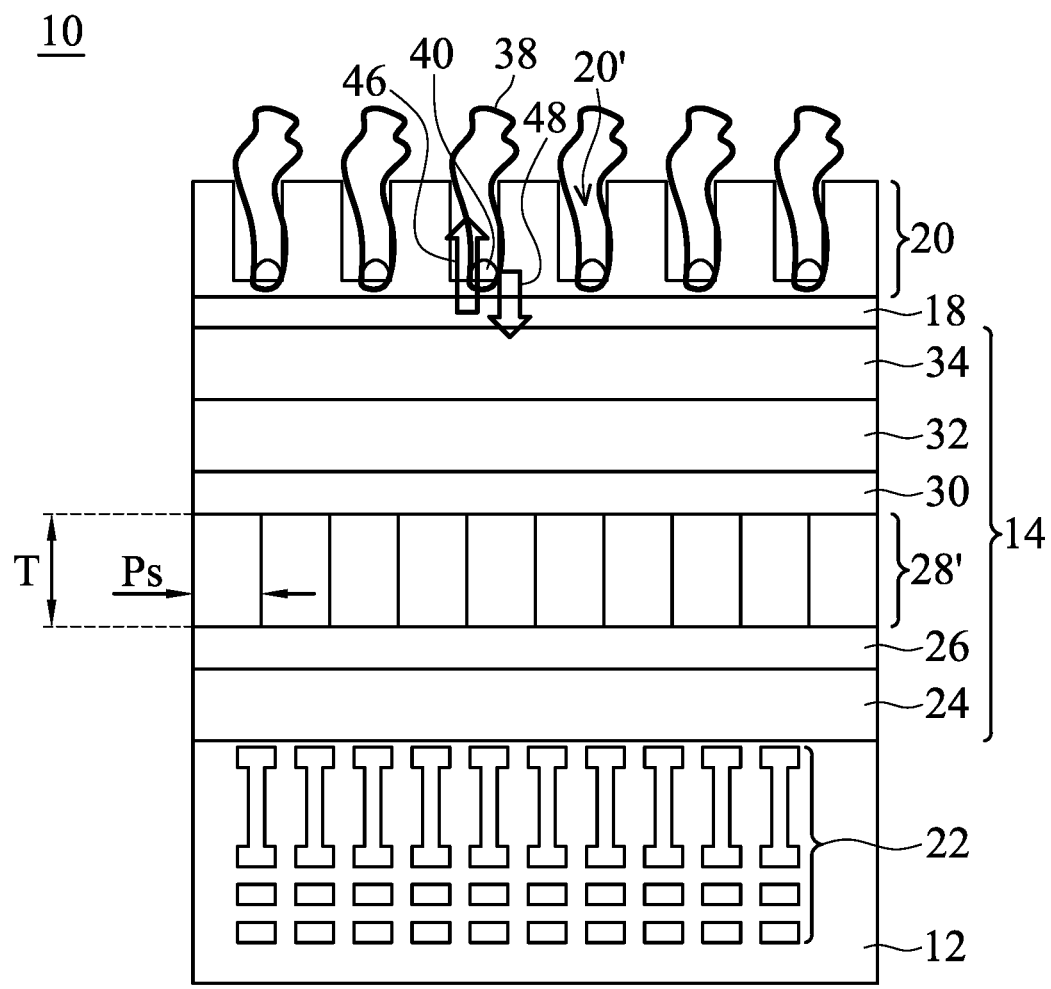
FIG. 3 shows a cross-sectional view of an optical device in accordance with one embodiment of the present invention.

Referring to FIGS. 3 and 4, in accordance with one embodiment of the present invention, an optical device 10 is provided. FIG. 3 shows a cross-sectional view of the optical device 10. FIG. 4 shows a top view of some components (i.e. a photoactive layer array) in the optical device 10.

As shown in FIG. 3, the optical device 10 includes a substrate 12, a photodetector 14, a waveguide 18 and a nanowell array 20. The photodetector 14 is disposed on the substrate 12. The waveguide 18 is disposed on the photodetector 14. The nanowell array 20 is disposed on the waveguide 18.

In some embodiments, the substrate 12 includes a silicon substrate, but the present invention is not limited thereto. In some embodiments, the substrate 12 includes a CMOS read circuit array 22.

The detailed structure of the photodetector 14 is further provided. In some embodiments, the photodetector 14 includes a bottom electrode 24, an electron transport layer (ETL) 26, a photoactive layer array 28', a hole transport layer (HTL) 30, a top electrode 32 and an encapsulation layer 34. The electron transport layer (ETL) 26 is disposed on the bottom electrode 24. The photoactive layer array 28' is disposed on the electron transport layer (ETL) 26. The hole transport layer (HTL) 30 is disposed on the photoactive layer array 28'. The top electrode 32 is disposed on the hole transport layer (HTL) 30. The encapsulation layer 34 is disposed on the top electrode 32.

As shown in FIGS. 3 and 4, in some embodiments, the photoactive layer array 28' includes a plurality of photoactive layers (for example, 28a, 28b, 28c and 28d) with different bandgaps configured in a mosaic on a level, for example, on the electron transport layer (ETL) 26. In some embodiments, the materials of the photoactive layers (28a, 28b, 28c and 28d) include organic semiconductors, inorganic semiconductors or perovskite, for example, amorphous silicon (a-Si), $Zu_2ZnSnS_4$, $CH_3NH_3PbCl_3$, $CH_3NH_3PbBr_3$, $CH_3NH_3PbI_3$ or blends of Rubrene, UPSQ, P3HT, PBT-OTT, OC1C10-PPV, PCDTBT, PDPPST, PDPP3T, PDPPSDTPS, PCBM, P70BM, C60, C70, ICBA, bis-PCBM, [60]IPB, N2200, Y6, Y7, COTIC-4Cl, 6TIC, ZY-4Cl, IEICO-4Cl, ITIC, ITIC-4F, ITIC-M, DTY6, BTP-eC9, ITIC-Th, o-IDTBR, ITIC-4Cl, COTIC-4Cl, 6TIC, IDT-2Br, COTIC-4F, ITIC-DM, ZY-4Cl, IEICO-4Cl, BTP-4Cl-12, N3, L8-BO-F, or L8-BO, but the present invention is not limited thereto. In some embodiments, the materials of the photoactive layers (28a, 28b, 28c and 28d) are different. For example, the material of the photoactive layer 28a has an absorption edge at wavelength of about 550 nm. The material of the photoactive layer 28b has an absorption edge at wavelength of about 650 nm. The material of the photoactive layer 28c has an absorption edge at wavelength of about 700 nm. The material of the photoactive layer 28d has an absorption edge at wavelength of about 750 nm. In some embodiments, the thickness T of the photoactive layer array 28' is larger than about 2 μm. As the thickness of photoactive layer array 28' is thicker than 2 μm, the photoresponse of the organic photodetectors become narrowband with the sensitivity at absorption band edge, therefore, no filter is needed.

In some embodiments, the waveguide 18 transmits short-wavelength light 46. In some embodiments, the wavelength of the short-wavelength light 46 is in a range from about 300 nm to about 500 nm. In some embodiments, the short-wavelength light 46 includes, for example, light with wavelength of 404 nm or 488 nm.

In some embodiments, a nanowell 20' in the nanowell array 20 is loaded with, for example, DNA 38 and polymerase 40 for identifying A, T, G and C bases on DNA 38. In some embodiments, the polymerase 40 converts the short-wavelength light 46 to long-wavelength light 48. In some embodiments, the wavelength of the long-wavelength light 48 is in a range from about 500 nm to about 800 nm.

In some embodiments, in the optical device 10, the pixel size Ps is less than or equal to about 10 μm.

Referring to FIG. 3, the sensing mechanism of the optical device 10 is further illustrated as follows. The waveguide 18 transmits the short-wavelength light 46 (i.e. excitation light) towards the nanowell 20' in the nanowell array 20. In the nanowell 20', polymerase 40 binds to a specific base (i.e. A, T, G or C) on DNA 38. The polymerase 40 absorbs the short-wavelength light 46 and emits the specific long-wavelength light 48 (i.e. emission light). The specific long-wavelength light 48 enters the photodetector 14. For example, when the polymerase 40 emits light with a wavelength of about 550 nm, the photoactive layer 28a absorbs the light with a wavelength of about 550 nm, converts the optical signal of the light into an electrical signal, and transmits the electrical signal to the readout circuit (not shown) in the substrate 12 to identify the specific base on DNA 38 which corresponds to the light with a wavelength of about 550 nm. When the polymerase 40 emits light with a wavelength of about 650 nm, the photoactive layer 28b absorbs the light with a wavelength of about 650 nm, converts the optical signal of the green light into an electrical signal, and transmits the electrical signal to the readout circuit (not shown) in the substrate 12 to identify the specific base on DNA 38 which corresponds to the light with a wavelength of about 650 nm. When the polymerase 40 emits light with a wavelength of about 700 nm, the photoactive layer 28c absorbs the orange light, converts the optical signal of the light with a wavelength of about 700 nm into an electrical signal, and transmits the electrical signal to the readout circuit (not shown) in the substrate 12 to identify the specific base on DNA 38 which corresponds to the light with a wavelength of about 700 nm. When the polymerase 40 emits light with a wavelength of about 750 nm, the photoactive layer 28d absorbs the light with a wavelength of about 750 nm, converts the optical signal of the red light into an electrical signal, and transmits the electrical signal to the readout circuit (not shown) in the substrate 12 to identify the specific base on DNA 38 which corresponds to the light with a wavelength of about 750 nm.

Figure 5A:
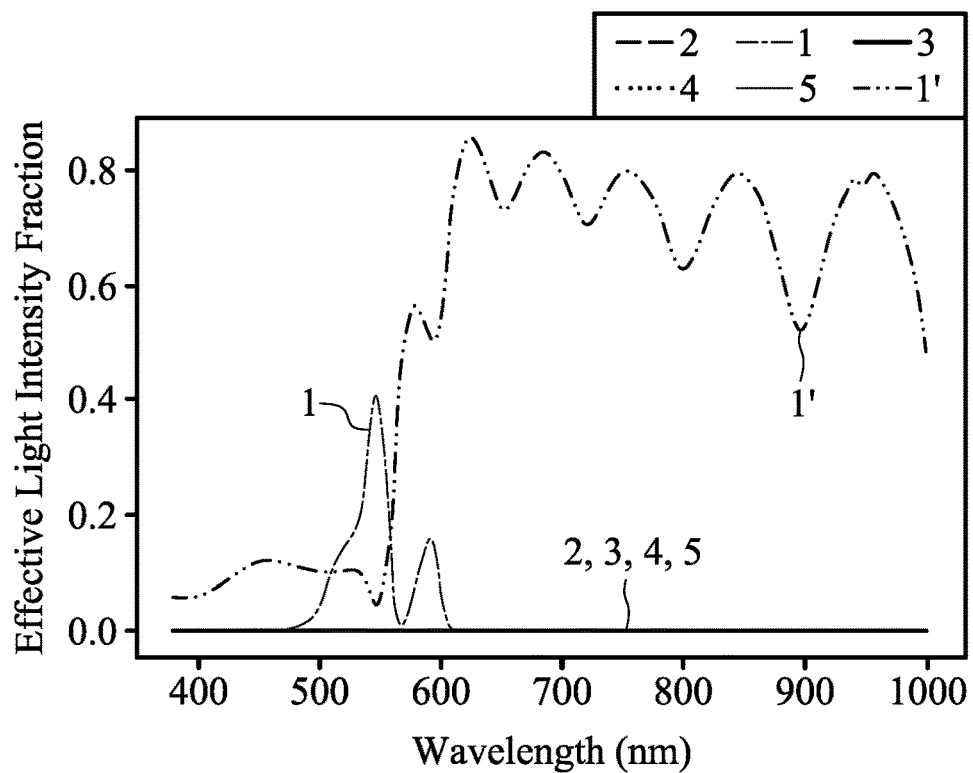
FIGS. 5A-5D show absorption and reflection spectrum of photodetectors in accordance with one embodiment of the present invention.

Next, according to the absorption and reflection spectrum of the photodetector 14 shown in FIGS. 5A-5D, it is further illustrated that the photoactive layers (28a, 28b, 28c and 28d) in the photodetector 14 can respectively absorb long-wavelength light with different wavebands and filter out short-wavelength light (i.e. with narrowband characteristics) to achieve the purpose of eliminating noise. In some embodiments, the wavelength of the excitation light transmitted by the waveguide 18 is in a range from about 300 nm to about 500 nm, for example, 404 nm or 488 nm. In FIG. 5A, the absorption intensity of the photoactive layer 28a (i.e. UPSQ) for different wavebands is represented by curve 1. From curve 1, the photoactive layer 28a represents a strong and narrow absorption band at wavelength of about 550 nm (may correspond to the blue light), for example, the absorption intensity of about 0.4. The absorption spectrum of other material layers in the photodetector is also illustrated, for example, the material layer of indium tin oxide (ITO) (represented by curve 2), aluminum (Al) (represented by curve 3), aluminum-doped zinc oxide (AZO) (represented by curve 4) and molybdenum oxide ($MoO_3$) (represented by curve 5). There is a great difference in the absorption intensity for different wavebands from the photoactive layer 28a. For example, from curves 2 to 5, it can be seen that such material layers (such as ITO, Al, AZO and $MoO_3$) hardly absorb in the whole band.

Figure 5B:
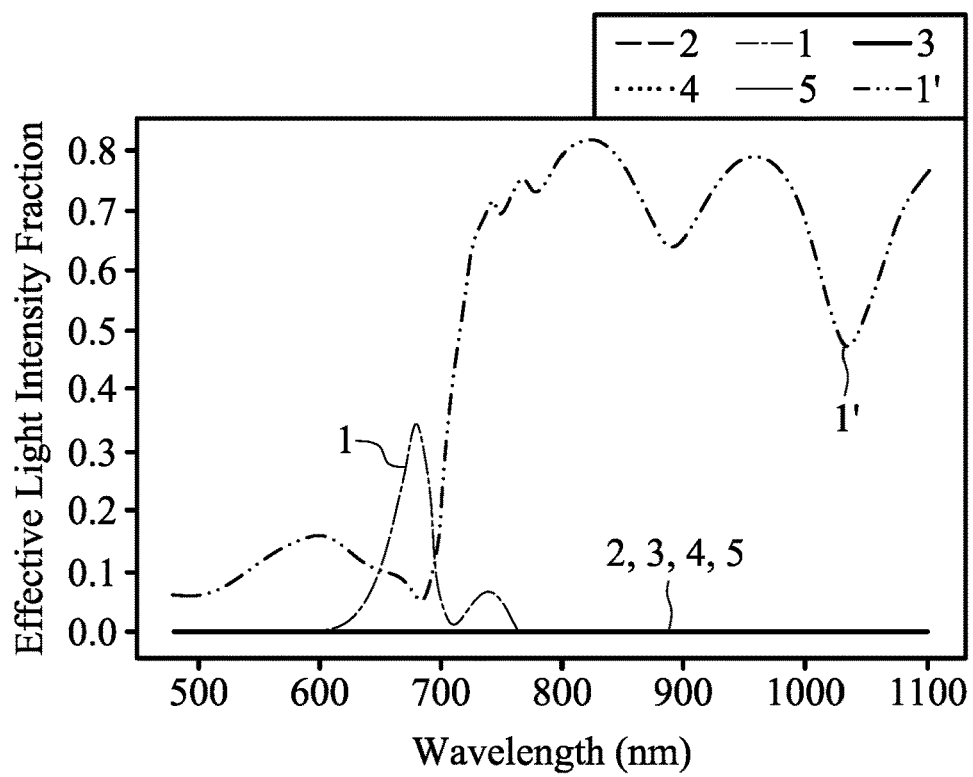

In FIG. 5B, the absorption intensity of the photoactive layer 28b (i.e. PBT-OTT: PCBM) for different wavebands is represented by curve 1. From curve 1, the photoactive layer 28b represents a strong and narrow absorption band at wavelength of about 650 nm (may correspond to the green light), for example, the absorption intensity of about 0.35. The absorption spectrum of other material layers in the photodetector is also illustrated, for example, the material layer of indium tin oxide (ITO) (represented by curve 2), aluminum (Al) (represented by curve 3), aluminum-doped zinc oxide (AZO) (represented by curve 4) and molybdenum oxide ($MoO_3$) (represented by curve 5). There is a great difference in the absorption intensity for different wavebands from the photoactive layer 28b. For example, from curves 2 to 5, it can be seen that such material layers (such as ITO, Al, AZO and $MoO_3$) hardly absorb in the whole band.

Figure 5C:
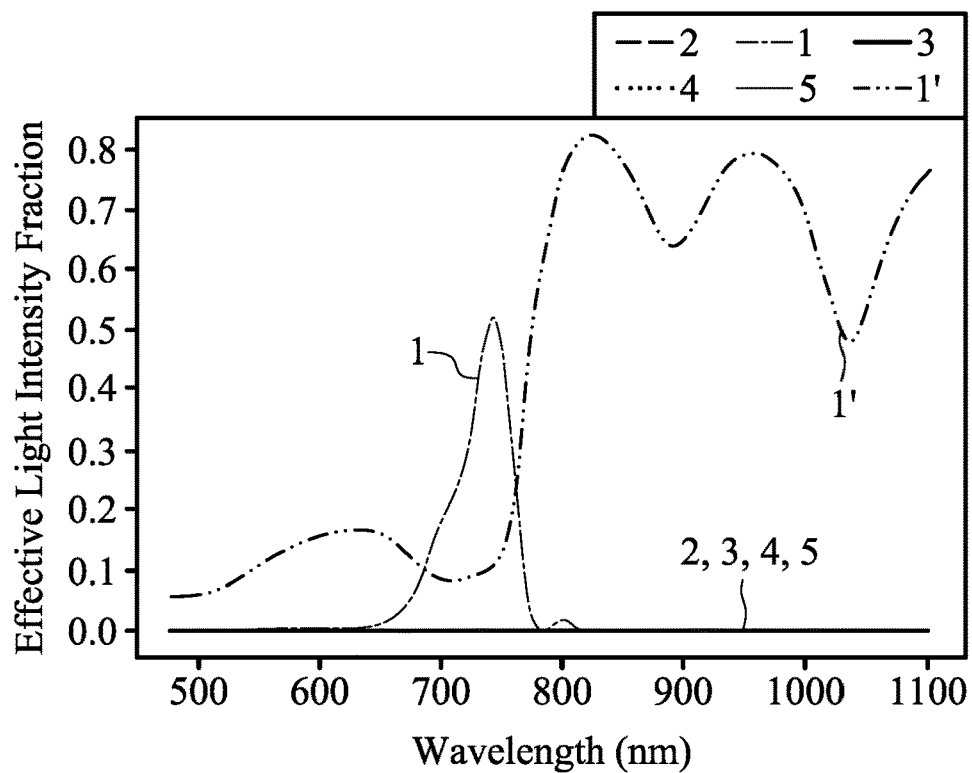

In FIG. 5C, the absorption intensity of the photoactive layer 28c (i.e. OC1C10-PPV: PCBM) for different wavebands is represented by curve 1. From curve 1, the photoactive layer 28c represents a strong and narrow absorption band at wavelength of about 700 nm (may correspond to the orange light), for example, the absorption intensity of about 0.5. The absorption spectrum of other material layers in the photodetector is also illustrated, for example, the material layer of indium tin oxide (ITO) (represented by curve 2), aluminum (Al) (represented by curve 3), aluminum-doped zinc oxide (AZO) (represented by curve 4) and molybdenum oxide ($MoO_3$) (represented by curve 5). There is a great difference in the absorption intensity for different wavebands from the photoactive layer 28c. For example, from curves 2 to 5, it can be seen that such material layers (such as ITO, Al, AZO and $MoO_3$) hardly absorb in the whole band.

Figure 5D:
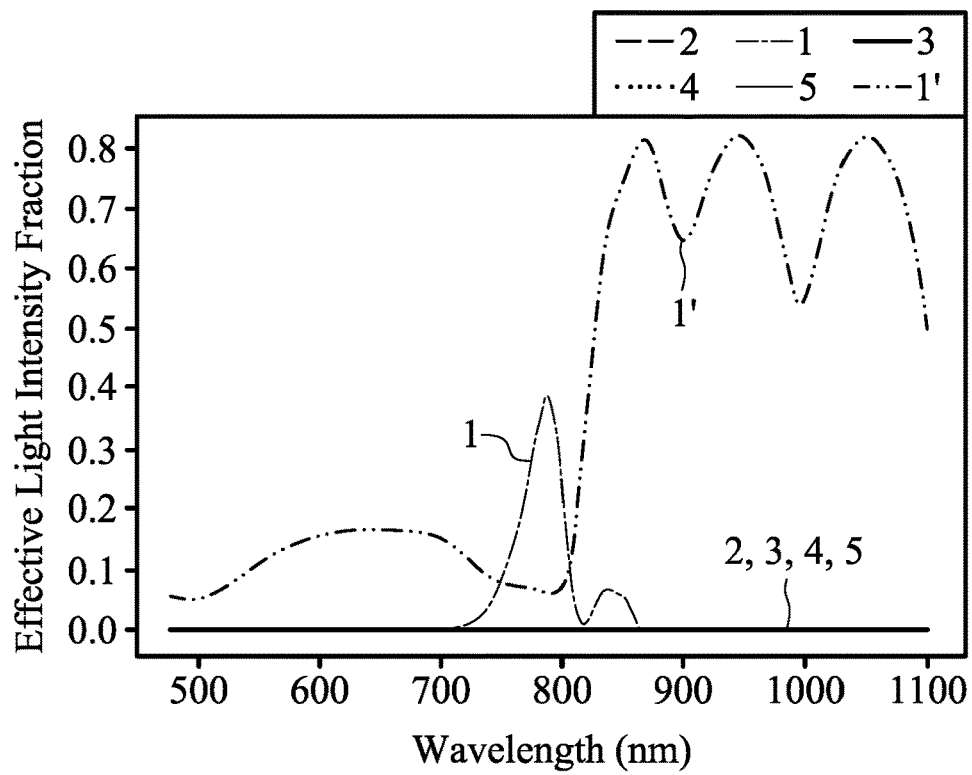

In FIG. 5D, the absorption intensity of the photoactive layer 28d (i.e. PTB7-Th: PCBM) for different wavebands is represented by curve 1. From curve 1, the photoactive layer 28d represents a strong and narrow absorption band at wavelength of about 750 nm (may correspond to the red light), for example, the absorption intensity of about 0.4. The absorption spectrum of other material layers in the photodetector is also illustrated, for example, the material layer of indium tin oxide (ITO) (represented by curve 2), aluminum (Al) (represented by curve 3), aluminum-doped zinc oxide (AZO) (represented by curve 4) and molybdenum oxide ($MoO_3$) (represented by curve 5). There is a great difference in the absorption intensity for different wavebands from the photoactive layer 28d. For example, from curves 2 to 5, it can be seen that such material layers (such as ITO, Al, AZO and $MoO_3$) hardly absorb in the whole band.

Therefore, the photoactive layers (28a, 28b, 28c and 28d) can respectively absorb long-wavelength light with different wavebands and filter out short-wavelength light (i.e. with narrowband characteristics) in deed.

Due to the thicker thickness of the photoactive layer array 28', for example, larger than about 2 μm, the short-wavelength light 46 can be filtered out by the photoactive layer array 28', at the same time, the photoactive layers in the photoactive layer array 28' have sensitivity in narrow-band light, respectively. Therefore, the photoactive layer array 28' does not absorb the short-wavelength light 46 (as noise in this case), achieving high S/N ratio.

Figure 6:
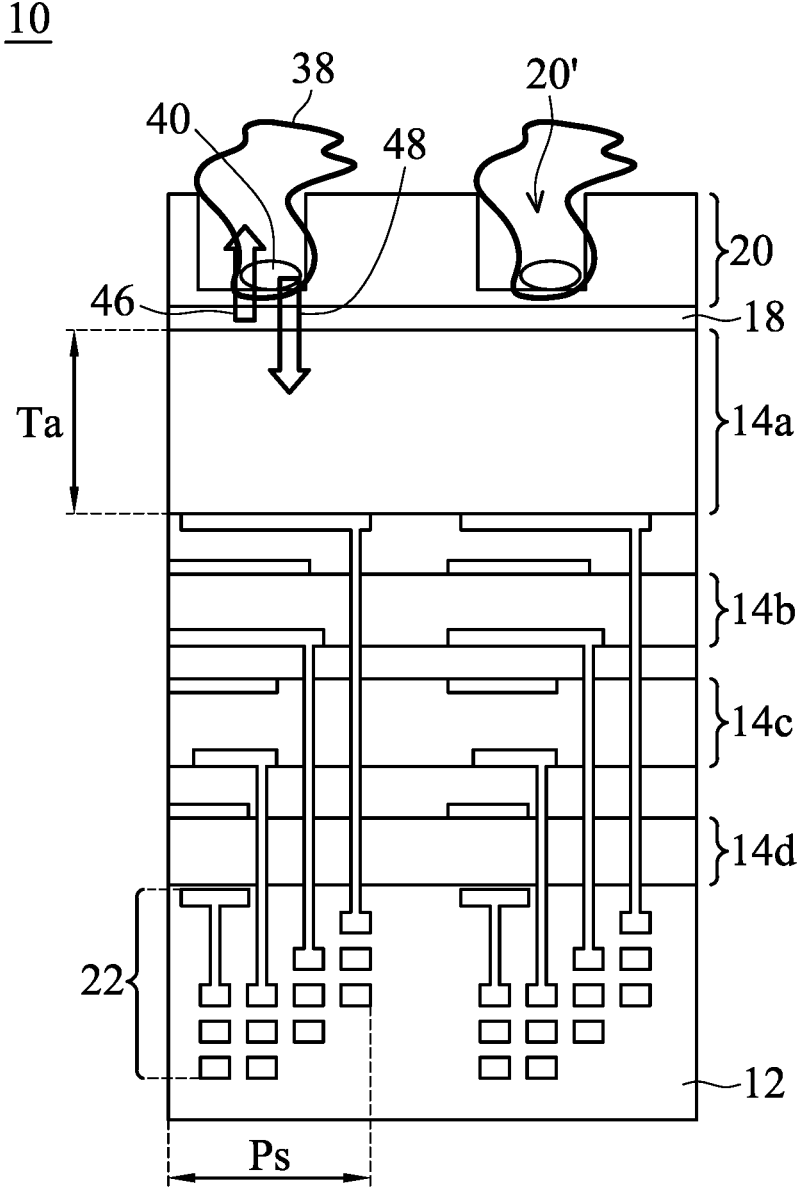
FIG. 6 shows a cross-sectional view of an optical device in accordance with one embodiment of the present invention.

Referring to FIG. 6, in accordance with one embodiment of the present invention, an optical device 10 is provided. FIG. 6 shows a cross-sectional view of the optical device 10.

As shown in FIG. 6, the optical device 10 includes a substrate 12, a first photodetector 14a, a second photodetector 14b, a third photodetector 14c, a fourth photodetector 14d, a waveguide 18 and a nanowell array 20. The fourth photodetector 14d is disposed on the substrate 12. The third photodetector 14c is disposed on the fourth photodetector 14d. The second photodetector 14b is disposed on the third photodetector 14c. The first photodetector 14a is disposed on the second photodetector 14b. The waveguide 18 is disposed on the first photodetector 14a. The nanowell array 20 is disposed on the waveguide 18.

In some embodiments, the substrate 12 includes a silicon substrate, but the present invention is not limited thereto. In some embodiments, the substrate 12 includes a CMOS read circuit array 22.

The detailed structure of each the first photodetector 14a, the second photodetector 14b, the third photodetector 14c and the fourth photodetector 14d includes a bottom electrode, an electron transport layer (ETL), a photoactive layer, a hole transport layer (HTL), a top electrode and an encapsulation layer, which is similar to the structure of the photodetector 14 shown in FIG. 1B, and will not be repeated here. In some embodiments, the bandgap of the photoactive layer in the first photodetector 14a is larger than the bandgap of the photoactive layer in the second photodetector 14b. The bandgap of the photoactive layer in the second photodetector 14b is larger than the bandgap of the photoactive layer in the third photodetector 14c. The bandgap of the photoactive layer in the third photodetector 14c is larger than the bandgap of the photoactive layer in the fourth photodetector 14d.

In some embodiments, the materials of the photoactive layers in the first photodetector 14a, the second photodetector 14b, the third photodetector 14c and the fourth photodetector 14d include organic semiconductors, inorganic semiconductors or perovskite, for example, inorganic semiconductors i.e. amorphous silicon (a-Si), $Cu_2ZnSnS_4$, Perovskite semiconductors i.e. $CH_3NH_3PbCl_3$, $CH_3NH_3PbBr_3$, $CH_3NH_3PbI_3$, $CsPbCl_3$, $CsPbBr_3$, $CsPbI_3$, or a blends of organic semiconductors such as Rubrene, UPSQ, P3HT, PBT-OTT, OC1C10-PPV, PCDTBT, PDPPST, PDPP3T, PDPPSDTPS, PCBM, P70BM, C60, C70, ICBA, bis-PCBM, [60]IPB, N2200, Y6, Y7, COTIC-4Cl, 6TIC, ZY-4Cl, IEICO-4Cl, ITIC, ITIC-4F, ITIC-M, DTY6, BTP-eC9, ITIC-Th, o-IDTBR, ITIC-4Cl, COTIC-4Cl, 6TIC, IDT-2Br, COTIC-4F, ITIC-DM, ZY-4Cl, IEICO-4Cl, BTP-4Cl-12, N3, L8-BO-F, or L8-BO, but the present invention is not limited thereto. In some embodiments, the materials of the photoactive layers in the first photodetector 14a, the second photodetector 14b, the third photodetector 14c and the fourth photodetector 14d are different. For example, the material of the photoactive layer in the first photodetector 14a absorbs light with a wavelength of about 550 nm. The material of the photoactive layer in the second photodetector 14b absorbs light with a wavelength between 530-650 nm. The material of the photoactive layer in the third photodetector 14c absorbs light with a wavelength of about 580-700 nm. The material of the photoactive layer in the fourth photodetector 14d absorbs light with a wavelength of about 620-750 nm. Specifically, in some embodiments, the thickness Ta of the top first photodetector 14a is larger than about 2 μm.

In some embodiments, the waveguide 18 transmits short-wavelength light 46. In some embodiments, the wavelength of the short-wavelength light 46 is in a range from about 300 nm to about 500 nm. In some embodiments, the short-wavelength light 46 includes, for example, blue light with wavelength of 404 nm or 488 nm.

In some embodiments, a nanowell 20' in the nanowell array 20 is loaded with, for example, DNA 38 and polymerase 40 for identifying A, T, G and C bases on DNA 38. In some embodiments, the polymerase 40 converts the short-wavelength light 46 to long-wavelength light 48. In some embodiments, the wavelength of the long-wavelength light 48 is in a range from about 500 nm to about 800 nm.

In some embodiments, in the optical device 10, the pixel size Ps is less than or equal to about 20 μm.

Referring to FIG. 6, the sensing mechanism of the optical device 10 is further illustrated as follows. The waveguide 18 transmits the short-wavelength light 46 (i.e. excitation light) towards the nanowell 20' in the nanowell array 20. In the nanowell 20', polymerase 40 binds to a specific base (i.e. A, T, G or C) on DNA 38. The polymerase 40 absorbs the short-wavelength light 46 and emits the specific long-wavelength light 48 (i.e. emission light). For example, when the polymerase 40 emits light with a wavelength of about 500-550 nm, since the photon energy of the light with a wavelength of about 500-550 nm is larger than the bandgap of the photoactive layer in the first photodetector 14a, the first photodetector 14a absorbs the light with a wavelength of about 500-550 nm, converts the optical signal of the blue light into an electrical signal, and transmits the electrical signal to the readout circuit (not shown) in the substrate 12 to identify the specific base on DNA 38 which corresponds to the blue light. When the polymerase 40 emits light with a wavelength between 550-600 nm, since the photon energy of the light with a wavelength between 550-600 nm is smaller than the bandgap of the photoactive layer in the first photodetector 14a but larger than the bandgap of the photoactive layer in the second photodetector 14b, the light with a wavelength between 550-600 nm passes through the first photodetector 14a. The second photodetector 14b absorbs the light with a wavelength between 530-650 nm, converts the optical signal of the green light into an electrical signal, and transmits the electrical signal to the readout circuit (not shown) in the substrate 12 to identify the specific base on DNA 38 which corresponds to the light with a wavelength between 550-600 nm. When the polymerase 40 emits light with a wavelength between 600-650 nm, since the photon energy of the light with a wavelength between 600-650 nm is smaller than the bandgaps of the photoactive layers in the first photodetector 14a and the second photodetector 14b but larger than the bandgap of the photoactive layer in the third photodetector 14c, the light with a wavelength between 600-650 nm passes through the first photodetector 14a and the second photodetector 14b. The third photodetector 14c absorbs the light with a wavelength between 580-700 nm, converts the optical signal of the orange light into an electrical signal, and transmits the electrical signal to the readout circuit (not shown) in the substrate 12 to identify the specific base on DNA 38 which corresponds to the light with a wavelength between 650-600-650 nm. When the polymerase 40 emits light with a wavelength between 650-750 nm, since the photon energy of the light with a wavelength between 650-750 nm is smaller than the bandgaps of the photoactive layers in the first photodetector 14a, the second photodetector 14b and the third photodetector 14c but larger than the bandgap of the photoactive layer in the fourth photodetector 14d, the light with a wavelength between 650-750 nm passes through the first photodetector 14a, the second photodetector 14b and the third photodetector 14c. The fourth photodetector 14d absorbs the light with a wavelength between 620-750 nm, converts the optical signal of the light with a wavelength between 620-750 nm into an electrical signal, and transmits the electrical signal to the readout circuit (not shown) in the substrate 12 to identify the specific base on DNA 38 which corresponds to the light with a wavelength between 650-750 nm.

Figure 7A:
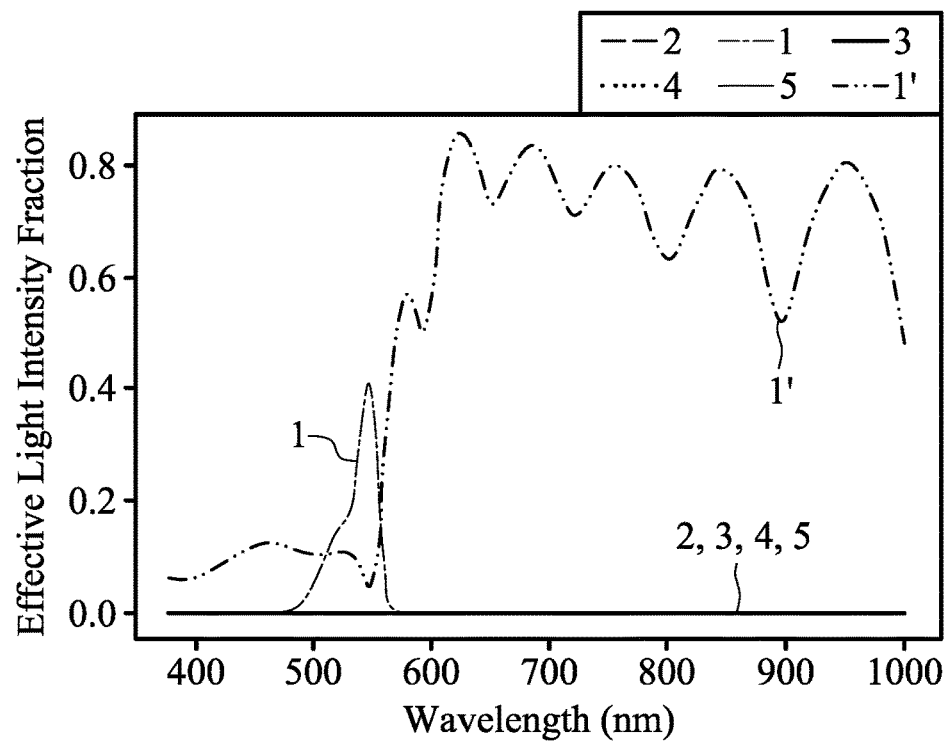
FIGS. 7A and 7B show absorption and reflection spectrum of photodetectors in accordance with one embodiment of the present invention.
Figure 7B:
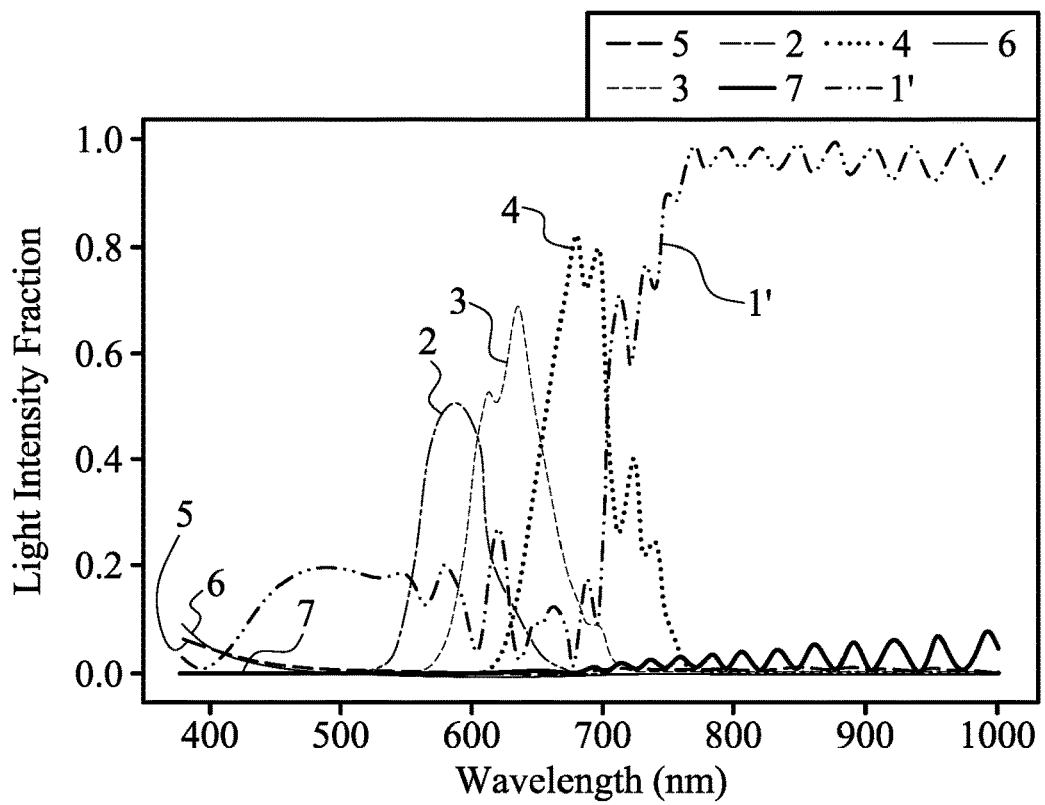

Next, according to the absorption and reflection spectrum of the photodetectors shown in FIGS. 7A and 7B, it is further illustrated that the first photodetector 14a, the second photodetector 14b, the third photodetector 14c and the fourth photodetector 14d can respectively absorb long-wavelength light with different wavebands and filter out short-wavelength light (i.e. with narrowband characteristics) to achieve the purpose of eliminating noise. In some embodiments, the wavelength of the excitation light transmitted by the waveguide 18 is in a range from about 300 nm to about 500 nm, for example, 404 nm or 488 nm. In FIG. 7A, the absorption intensity of the photoactive layer (i.e. UPSQ) of the first photodetector 14a for different wavebands is represented by curve 1. From curve 1, the photoactive layer of the first photodetector 14a represents a strong and narrow absorption band at wavelength of about 550 nm (may correspond to the blue light), for example, the absorption intensity of about 0.4. The absorption spectrum of other material layers in the photodetector is also illustrated, for example, the material layer of indium tin oxide (ITO) (represented by curve 2), aluminum (Al) (represented by curve 3), aluminum-doped zinc oxide (AZO) (represented by curve 4) and molybdenum oxide ($MoO_3$) (represented by curve 5). There is a great difference in the absorption intensity for different wavebands from the first photodetector 14a. For example, from curves 2 to 5, it can be seen that such material layers (such as ITO, Al, AZO and $MoO_3$) hardly absorb in the whole band.

In FIG. 7B, the absorption intensity of the photoactive layer (i.e. PBT-OTT: PCBM) of the second photodetector 14b for different wavebands is represented by curve 2. The absorption intensity of the photoactive layer (i.e. OC1C10-PPV: PCBM) of the third photodetector 14c for different wavebands is represented by curve 3. The absorption intensity of the photoactive layer (i.e. PTB7-Th: PCBM) of the fourth photodetector 14d for different wavebands is represented by curve 4.

From curve 2, the photoactive layer (i.e. PBT-OTT: PCBM) of the second photodetector 14b has strong absorption for the specific long-wavelength emission light with the wavelength of about 530-650 nm, for example, the absorption intensity of about 0.5 or more. However, the photoactive layer of the second photodetector 14b hardly absorbs the emission light with the wavelength of lower than 550 nm. From curve 3, the photoactive layer (i.e. OC1C10-PPV: PCBM) of the third photodetector 14c has strong absorption for the specific long-wavelength emission light with the wavelength of about 580-700 nm, for example, the absorption intensity of about 0.7 or more. However, the photoactive layer of the third photodetector 14c hardly absorbs the emission light with the wavelength of lower than 580 nm. From curve 4, the photoactive layer (i.e. PTB7-Th: PCBM) of the fourth photodetector 14d has strong absorption for the specific long-wavelength emission light with the wavelength of about 620-750 nm (may correspond to the red light), for example, the absorption intensity of about 0.8 or more. However, the photoactive layer of the fourth photodetector 14d hardly absorbs the emission light with the wavelength of lower than 620 nm."

The absorption spectrum of other material layers in the photodetectors is also illustrated, for example, the material layer of indium tin oxide (ITO) (represented by curve 5), the interlayer (represented by curve 6) and the material layer of silver (Ag) (represented by curve 7). There is a great difference in the absorption intensity for different wavebands from the photoactive layers. For example, from curves 5 to 7, it can be seen that such material layers (such as ITO, the interlayer and Ag) hardly absorb the long-wavelength emission light with the wavelength of about 500-800 nm. In addition, the reflection intensity of the photodetectors for different wavebands is represented by curve 1'. From curve 1', the photodetectors have strong reflection for the long-wavelength emission light with the wavelength of more than 800 nm, for example, the reflection intensity of about 0.9 or more. Therefore, the first photodetector 14a, the second photodetector 14b, the third photodetector 14c and the fourth photodetector 14d can respectively absorb long-wavelength light with different wavebands and filter out short-wavelength light (i.e. with narrowband characteristics) in deed.

Due to the thicker thickness of the first photodetector 14a, for example, larger than about 2 μm, the short-wavelength light 46 can be filtered out by the first photodetector 14a, at the same time, the first photodetector 14a, the second photodetector 14b, the third photodetector 14c and the fourth photodetector 14d have sensitivity in narrow-band light, respectively. Therefore, the first photodetector 14a, the second photodetector 14b, the third photodetector 14c and the fourth photodetector 14d do not absorb the short-wavelength light 46 (as noise in this case), achieving high S/N ratio.

In the present invention, when the long-wavelength light is used as a light source, in combination with the fluorescently-labeled nucleotides that can convert the long-wavelength light to the short-wavelength light located in the sample wells, and the wide bandgap semiconductors that has sensitivity in the short-wavelength light used in the photoactive layer, there is no need to add a long-pass or short-pass filter, which significantly reduces the module thickness, allowing for smaller pixel size, without the problem of optical crosstalk. In addition, when the short-wavelength light is used as a light source, in combination with the thick photoactive layer, the short-wavelength light (i.e. noise) can be filtered out by the thick photoactive layer, at the same time, the photoactive layer improves the sensitivity in narrow-band light (i.e. signal), achieving high S/N ratio. The present invention provides a high-resolution and small-pixel-size optical device for third generation sequencing (TGS).

Although some embodiments of the present invention and their advantages have been described in detail, it should be understood that various changes, substitutions and alterations can be made herein without departing from the spirit and scope of the invention as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and operations described in the specification. As one of ordinary skill in the art will readily appreciate from the disclosure of the present disclosure, processes, machines, manufacture, compositions of matter, means, methods, or operations, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or operations.

What is claimed is:

1. An optical device, comprising:
   a substrate;
   a first photodetector disposed on the substrate, wherein the first photodetector comprises a first photoactive layer with a first bandgap which is in a range from 1.5 eV to 2.5 eV;
   a waveguide disposed on the first photodetector, wherein the waveguide is in contact with the first photodetector or apart from the first photodetector by a color filter array which is in contact with the waveguide and the first photodetector; and
   a nanowell array disposed on the waveguide.

2. The optical device as claimed in claim 1, wherein the substrate comprises a CMOS read circuit array.

3. The optical device as claimed in claim 1, wherein the waveguide transmits long-wavelength light with a wavelength of 800 nm to 1,600 nm, and the nanowell array is loaded with fluorescently-labeled nucleotides that convert the long-wavelength light to short-wavelength light with a wavelength of 400 nm to 800 nm.

4. The optical device as claimed in claim 3, wherein the first bandgap is smaller than photon energy of the short-wavelength light and larger than photon energy of the long-wavelength light, and the optical device has a pixel size less than 10 μm.

5. The optical device as claimed in claim 4, wherein the first photoactive layer comprises organic semiconductors, inorganic semiconductors or perovskite semiconductors.

6. The optical device as claimed in claim 4, wherein the first photoactive layer absorbs the short-wavelength light.

7. The optical device as claimed in claim 4, further comprising a second photodetector comprising a second photoactive layer with a second bandgap disposed between the substrate and the first photodetector, wherein the first bandgap of the first photoactive layer is larger than the second bandgap of the second photoactive layer.

8. The optical device as claimed in claim 7, further comprising a third photodetector comprising a third photoactive layer with a third bandgap disposed between the substrate and the second photodetector, wherein the second bandgap of the second photoactive layer is larger than the third bandgap of the third photoactive layer.

9. The optical device as claimed in claim 8, further comprising a fourth photodetector comprising a fourth photoactive layer with a fourth bandgap disposed between the substrate and the third photodetector, wherein the third bandgap of the third photoactive layer is larger than the fourth bandgap of the fourth photoactive layer, and the optical device has a pixel size less than 20 μm.

10. The optical device as claimed in claim 9, wherein the first photoactive layer absorbs short-wavelength light with a wavelength of 400 nm to 550 nm, the second photoactive layer absorbs short-wavelength light with a wavelength of 530 nm to 650 nm, the third photoactive layer absorbs short-wavelength light with a wavelength of 580 nm to 700 nm, and the fourth photoactive layer absorbs short-wavelength light with a wavelength of 620 nm to 750 nm.

11. The optical device as claimed in claim 1, wherein the waveguide transmits short-wavelength light with a wavelength of 300 nm to 500 nm.

12. The optical device as claimed in claim 11, wherein the nanowell array is loaded with polymerase that converts the short-wavelength light to long-wavelength light with a wavelength of 500 nm to 800 nm.

13. The optical device as claimed in claim 12, wherein the first photodetector comprises the first photoactive layer with the first bandgap, a second photoactive layer with a second bandgap, a third photoactive layer with a third bandgap, and a fourth photoactive layer with a fourth bandgap configured in a mosaic on a level, and the first bandgap, the second bandgap, the third bandgap, and the fourth bandgap are different.

14. The optical device as claimed in claim 13, wherein the first photoactive layer, the second photoactive layer, the third photoactive layer, and the fourth photoactive layer have a thickness larger than 2 μm.

15. The optical device as claimed in claim 14, wherein the first photoactive layer absorbs long-wavelength light with a wavelength of 550 nm, the second photoactive layer absorbs long-wavelength light with a wavelength of 650 nm, the third photoactive layer absorbs long-wavelength light with a wavelength of 700 nm, and the fourth photoactive layer absorbs long-wavelength light with a wavelength of 750 nm.

16. The optical device as claimed in claim 12, wherein the first photodetector comprises the first photoactive layer with the first bandgap and has a thickness larger than 2 μm.

17. The optical device as claimed in claim 16, further comprising a second photodetector comprising a second photoactive layer with a second bandgap disposed between the substrate and the first photodetector, wherein the first bandgap of the first photoactive layer is larger than the second bandgap of the second photoactive layer.

18. The optical device as claimed in claim 17, further comprising a third photodetector comprising a third photoactive layer with a third bandgap disposed between the substrate and the second photodetector, wherein the second bandgap of the second photoactive layer is larger than the third bandgap of the third photoactive layer.

19. The optical device as claimed in claim 18, further comprising a fourth photodetector comprising a fourth photoactive layer with a fourth bandgap disposed between the substrate and the third photodetector, wherein the third bandgap of the third photoactive layer is larger than the fourth bandgap of the fourth photoactive layer.

20. The optical device as claimed in claim 19, wherein the first photoactive layer absorbs long-wavelength light with a wavelength of 550 nm, the second photoactive layer absorbs long-wavelength light with a wavelength of 530-650 nm, the third photoactive layer absorbs long-wavelength light with a wavelength of 580-700 nm, and the fourth photoactive layer absorbs long-wavelength light with a wavelength of 620-750 nm.

* * * * *